United States Patent
Eun et al.

(10) Patent No.: US 9,467,729 B2
(45) Date of Patent: Oct. 11, 2016

(54) METHOD FOR REMOTELY CONTROLLING SMART TELEVISION

(71) Applicants: Ik Soo Eun, Seoul (KR); Myung Jin Eun, Seoul (KR)

(72) Inventors: Ik Soo Eun, Seoul (KR); Myung Jin Eun, Seoul (KR)

( * ) Notice: Subject to any disclaimer, the term of this patent is extended or adjusted under 35 U.S.C. 154(b) by 0 days.

(21) Appl. No.: 14/762,994

(22) PCT Filed: Dec. 31, 2013

(86) PCT No.: PCT/KR2013/012426
§ 371 (c)(1),
(2) Date: Jul. 23, 2015

(87) PCT Pub. No.: WO2014/119852
PCT Pub. Date: Aug. 7, 2014

(65) Prior Publication Data
US 2015/0326909 A1    Nov. 12, 2015

(30) Foreign Application Priority Data

Jan. 29, 2013  (KR) ........................ 10-2013-0010024

(51) Int. Cl.
| | |
|---|---|
| *H04N 5/44* | (2011.01) |
| *H04N 21/41* | (2011.01) |
| *G06F 3/041* | (2006.01) |
| *G06F 3/0481* | (2013.01) |
| *G06F 3/0484* | (2013.01) |
| *G06F 3/0488* | (2013.01) |
| *H04N 21/422* | (2011.01) |
| *H04N 21/4782* | (2011.01) |
| *H04N 21/443* | (2011.01) |
| *H04N 21/485* | (2011.01) |

(52) U.S. Cl.
CPC ........ *H04N 21/4126* (2013.01); *G06F 3/0416* (2013.01); *G06F 3/04812* (2013.01); *G06F 3/04842* (2013.01); *G06F 3/04883* (2013.01); *H04N 21/4222* (2013.01); *H04N 21/42224* (2013.01); *H04N 21/4438* (2013.01); *H04N 21/4782* (2013.01); *H04N 21/485* (2013.01)

(58) Field of Classification Search
USPC ................. 348/734; 345/156–158, 169, 173
See application file for complete search history.

(56) References Cited

U.S. PATENT DOCUMENTS

| | | | | |
|---|---|---|---|---|
| 2010/0169842 | A1* | 7/2010 | Migos ................ | G06F 3/04883 715/863 |
| 2012/0311438 | A1* | 12/2012 | Cranfill ............. | G06F 17/30011 715/256 |
| 2013/0278631 | A1* | 10/2013 | Border ................ | G02B 27/017 345/633 |
| 2015/0066643 | A1* | 3/2015 | Choi .................. | G06Q 30/0255 705/14.53 |

(Continued)

FOREIGN PATENT DOCUMENTS

| | | |
|---|---|---|
| JP | 08-265878 | 10/1996 |
| KR | 10-2003-0030485 | 4/2003 |

OTHER PUBLICATIONS

International Search Report PCT/KR/2013/012426 dated Feb. 3, 2014.

*Primary Examiner* — Paulos M Natnael
(74) *Attorney, Agent, or Firm* — Roberts Mlotkowski Safran Cole & Calderon, PC (57) ABSTRACT

A method for remote controlling of a smart TV. With the method for remote controlling, the user does not look at the remote controller's touchscreen and remote-controls the smart TV by looking at the motion of the cursor on the smart TV, which is an object to control and manipulating the touchscreen. Therefore, the smart TV can be controlled freely and comfortably as if holding it like a smart phone in hand.

21 Claims, 6 Drawing Sheets

(56) References Cited

U.S. PATENT DOCUMENTS

| | | | | |
|---|---|---|---|---|
| 2015/0186002 A1* | 7/2015 | Suzuki | ................. | G06F 3/0482 715/830 |
| 2015/0370323 A1* | 12/2015 | Cieplinski | ............... | G06F 3/013 345/156 |
| 2015/0370920 A1* | 12/2015 | Van Os | ............. | G06F 17/30973 707/767 |

* cited by examiner

METHOD FOR REMOTELY CONTROLLING SMART TELEVISION

FIELD OF INVENTION

The invention relates to a method for remote controlling of smart TV conveniently, more specifically to a method for remotely controlling smart TV as if holding a smart phone in hand.

BACKGROUND TECHNOLOGY

The smart TV is a kind of TV, on which it is possible to switch to and watch the screens for TV, mobile phone, PC, etc. freely without any interruption of data, and called as Internet TV or Connected TV. The smart TV works as a communication center that enables to download and watch contents in real time, and check news, weather, email, etc. anytime. It is a multi-functional TV, which combines the function of Internet access with TV, and enables, in addition to the traditional TV watching, to use web-surfing, VOD watching, search and input, social network service, game, etc. by installing various apps.

Conventional smart phone or smart pad can be manipulated to input and the like by touching a screen with a finger or pen directly while holding it with hand or putting it on a table. However, since the smart TV is a few meters away from the user as in the conventional TV, it is not practical to touch the screen directly to input. It is unavoidable to control the smart TV with a remote.

However, since the smart TV is a device that can provide much more functions and services than the conventional TV, the conventional remote controller for the conventional TV having simple functions such as channel selection, volume control, etc. only is not appropriate. A new remote controller with control functions suitable for the smart TV is needed. Since the functions of smart TV are various and complicated, if it is to be realized with a button-type, too many buttons must be provided. Then, such too many buttons would make its structure complicated, and it would be inconvenient for the user to learn the functions of buttons and to use properly.

Touchscreen-type remote controller may solve the above problems. However, some of the conventional touchscreen-type remote controllers make the user navigate menus for searching for a right command, forcing the user look at the using remote controller and control all the time. Since it must be checked on the screen of remote controller whether the controlling has been done correctly, the user must look at the smart TV screen and control, which is cumbersome and not preferable.

Other touchscreen-type remote controller communicates bidirectionally with the smart TV that is being controlled remotely and commands the smart TV to display a specific graphic user interface (GUI) on the remote controller. Since the GUI on the remote controller changes according to a context of display of the smart TV, the user must look at the GUI for manipulating the remote controller, which is inconvenient.

DETAILED DESCRIPTION OF INVENTION

Problems to Solve

People are accustomed to the usage of PC such as moving a cursor with a mouse and selecting a desired item to execute. Also, recently due to fast introduction of smart phones, there are many people who are accustomed to controlling of touchscreen of smart phones.

Considering such situations, the inventor has thought out that a synergy effect may be expected by combining the merit of touchscreen control with the advantage of control using a mouse f or remote controlling of the smart TV.

Thus, it is an object of the invention to provide a method for remotely controlling a smart TV, in which the user just looks at the movement of cursor on the screen of smart TV to control without looking at the touchscreen of remote, and controls the smart TV freely and comfortably as if holding a smart phone in hand.

Solutions to Problems

According to an aspect of the invention for solving the above problems, a method for selecting a specific item and executing is provided. This remote controlling method, in which a remote controller having a touch-type input means including a touchscreen or a touch pad executes a specific program, sends wirelessly a remote-controlling signal to a display device having a screen, and controls the display device, comprises steps for: (a) if a touch of a user's finger occurs on a spot of a touch surface of the touch-type input means, the remote controller's sending a first remote-controlling signal having information on position and time of the touch to the display device, and the display device's displaying a cursor at a region corresponding to the position of the touch on the screen based on the received first remote-controlling signal; (b) if the user's finger drags along a first drag path while being in touch with the touch surface of the touch-type input means, the remote controller's sending a second remote-controlling signal having information on tracking path of the first drag path to the display device, and the display device's displaying so that the cursor moves along a path on the display device corresponding to the first drag path based on the received second remote-controlling signal; and (c) if it is (i) a first case that the user's finger on the touch surface of the touch-type input means maintains a touch state at an ending portion of the first drag path longer than a first specific time period, (ii) a second case that the user's finger on the touch surface of the touch-type input means releases the touch state at the ending portion of the first drag path within a second specific time period and touches the ending portion again right away within a third specific time period, or (iii) a third case that the first drag path includes a drag having a shape of a check mark (✓), the remote controller's sending a third remote-controlling signal containing a selection command for a specific item positioned at the ending portion of the first drag path or the check mark to the display device, and the display device's processes to select the specific item from the screen based on the received third remote-controlling signal, wherein touch-related motions that the user performs on the touch surface of the touch-type input means of the remote is configured to be displayed correspondingly on the screen of the display device, so that the user controls remotely just looking at the screen of the display device, without any need to look at the remote controller.

The method for remote controlling, as a method for remote-controlling of executing a specific item, may further comprise a step for (d) the remote controller's sending a fourth remote-controlling signal containing an execution command of the specific item where the ending portion of the first drag path or the check mark (✓) is positioned to the display device, and the display device's processing the execution of the specific item based on the fourth remote-controlling signal and at the same time displaying a result of the execution, in a case that (1) in any one of the first case, the second case, and the third case, with the user's finger on the touch surface of the touch-type input means, the specific item is selected and double-touches a specific region including the ending portion of the first drag path or the check mark (✓) in a fourth specific time period, (2) after the drag after releasing the touch within a fifth specific time period at the ending portion of the first drag path or an end of the check mark (✓), (α) a sixth specific time period passes without any operation or (β) within a seventh specific time period the user 'touches and then releases the touch at' the specific region including the ending portion of the first drag path or the end of the check mark (✓), or (3) the user double-touches the specific region including the ending portion of the first drag path or the check mark (✓) within an eighth specific time period.

The method for remote controlling, also as a method for remote-controlling of executing a specific item, may further comprise a step for (d-1) the remote's sending a fifth remote-controlling signal containing an execution command of the specific item where the ending portion of the first drag path or the check mark (✓) is positioned to the display device, and the display device's processing the execution of the specific item based on the fifth remote-controlling signal and at the same time displaying a result of the execution, in a case that after the user's finger on the touch surface of the touch-type input means selects the specific item corresponding to the second case or the third case of the step (c) and releases the touch at the ending portion of the first drag path or at the end of the check mark (✓), (α) a ninth specific time period passes without any operation or (β) the user 'touches and then releases the touch at' or double-touches the specific region including the ending portion of the first drag path or the check mark (✓).

The method for remote controlling, for remote-controlling of moving of a specific item, may further comprise a step for (e) in a state that the specific item is selected through the step (c), if a tenth specific time period passes after the user's finger on the touch surface of the touch-type input means drags to and releases the touch at a desired position along a second drag path while touching a portion where the ending portion of the first drag path or the check mark (✓) is positioned, the remote's sending a sixth remote-controlling signal containing an information on the second drag path and a movement command of the specific item to the display device, and the display device's processing so that the specific item moves along the second drag path based on the sixth remote-controlling signal.

The method for remote controlling, for remote-controlling of deleting of a specific item, may further comprise steps for: (f) setting a border band circumnavigating an edge portion of the touch surface of the touch-type input means in the remote controller; and (g) if the user's finger drags outside crossing the border band in a state that the user's finger touches a position on the touch surface of the touch-type input means corresponding to the specific item selected through the step (c), the remote controller's sending a seventh remote-controlling signal containing a deletion command of the selected specific item to the display device, and the display device's processing so that the specific item is deleted based on the seventh remote-controlling signal.

The method for remote controlling, for remote-controlling of scrolling of screen and turning a page, may further comprise steps for: (f) setting a border band circumnavigating an edge portion of the touch surface of the touch-type input means in the remote controller; and (h) if the user's finger drags from outside the border band on the touch surface of the touch-type input means to a region enclosed by the border band or reversely, the remote controller's sending an eighth remote-controlling signal containing information of drag direction and speed and a screen scroll command to the display device, and the display device's processing so that a present page displayed on the screen scrolls with the drag direction and speed based on the eighth remote-controlling signal.

The method for remote controlling, for remote-controlling of selecting and editing of a desired item, may further comprise a step for (j) if other finger of the user touches an arbitrary position on the touch surface of the touch-type input means in a state the specific item is selected through the step (c), the remote controller's sending a ninth remote-controlling signal containing a position information of the ending portion of the first drag path or the check mark (✓) and editing-mode information on the specific item positioned at the ending portion or the check mark (✓) to the display device, and the display device's displaying an editing menu containing more than one editing functions and processing so as to enable editing using the editing functions based on the ninth remote-controlling signal.

On the other hand, according to another aspect of the invention, in order to remote-control selecting and then moving a desired region, a method for remote controlling in which a remote controller having a touch-type input means including a touchscreen or a touch pad executes a specific program, sends wirelessly a remote-controlling signal to a display device having a screen, and controls the display device, the method comprising steps for: (k1) if a state that two fingers of the user touch two positions on the touch surface of the touch-type input means at the same time is maintained for over an eleventh specific time period, the remote controller's sending a tenth remote-controlling signal containing position information of the two positions touched at the same time and a region-selection command to the display device, and the display device's determining a rectangular region with a line connecting two positions on the screen corresponding to the two positions as a diagonal line and processing all items existing in the rectangular region as selected based on the received tenth remote-controlling signal, and (k2) if within a twelfth specific time period after the user's two fingers touch the two positions on the touch surface of the touch-type input means any one of the two fingers releases the touch and the remaining one drags so as to circumnavigate along a closed curve path, the remote controller's sending an eleventh remote-controlling signal containing information of the closed curve path and a region-selection command to the display device, and the display device's determining a non-polygonal region formed by a closed curve path on the screen corresponding to the closed curve path and processing so as to have all items existing in the non-polygonal region selected based on the eleventh remote-controlling signal; and (l) if in a state of touching a specific region of the touch surface of the touch-type input means corresponding to the rectangular or non-polygonal region the user's finger drags along a third drag path, releases the touch, and a thirteenth specific time period passes, the remote controller's sending an twelfth remote-controlling signal containing information of the third drag path and a movement command of all items in the selected rectangular region or non-polygonal region to the display device, and the display device's processing so as to have all items existing in the rectangular region or non-polygonal region move along the third drag path based on the twelfth remote-controlling signal, wherein the user looks at the screen of the display device without looking at the remote controller and remote-controls by displaying touch-related motions that the user performs on the touch surface of the touch-type input means of the remote controller correspondingly on the screen of the display device.

According to still another aspect of the invention, in order to remote-control deleting all items in a region, a method for remote controlling in which a remote controller having a touch-type input means including a touchscreen or a touch pad executes a specific program, sends wirelessly a remote-controlling signal to a display device having a screen, and controls the display device, the method comprising steps for: (f) setting a border band circumnavigating an edge portion of the touch surface of the touch-type input means; and (k1) if a state that two fingers of the user touch two positions on the touch surface of the touch-type input means at the same time is maintained for over an eleventh specific time period, the remote controller's sending a tenth remote-controlling signal containing position information of the two positions touched at the same time and a region-selection command to the display device, and the display device's determining a rectangular region with a line connecting two positions on the screen corresponding to the two positions as a diagonal line and processing all items existing in the rectangular region as selected based on the received tenth remote-controlling signal, and (k2) if within a twelfth specific time period after the user's two fingers touch the two positions on the touch surface of the touch-type input means any one of the two fingers releases the touch and the remaining one drags so as to circumnavigate along a closed curve path, the remote controller's sending an eleventh remote-controlling signal containing information of the closed curve path and a region-selection command to the display device, and the display device's determining a non-polygonal region formed by a closed curve path on the screen corresponding to the closed curve path and processing so as to have all items existing in the non-polygonal region selected based on the eleventh remote-controlling signal; and (m) if in a state of touching a specific region on the touch surface of the touch-type input means corresponding to the rectangular or non-polygonal region the user's finger drags outward crossing the border band, the remote controller's sending a thirteenth remote-controlling signal containing a deletion command of all items in the selected rectangular or non-polygonal region to the display device, and the display device's processing so as to have all items in the rectangular or non-polygonal region deleted based on the thirteenth remote-controlling signal, wherein the user looks at the screen of the display device without looking at the remote controller and remote-controls by displaying touch-related motions that the user performs on the touch surface of the touch-type input means of the remote controller correspondingly on the screen of the display device.

According to still another aspect of the invention, in order to remote-control enlarging and diminishing of a current screen, a method for remote controlling in which a remote controller having a touch-type input means including a touchscreen or a touch pad executes a specific program, sends wirelessly a remote-controlling signal to a display device having a screen, and controls the display device, the method comprising steps for: (n) if a finger of the user drags in an enlarging helix on the touch surface of the touch-type input means while touching, the remote controller's sending a fourteenth remote-controlling signal containing a screen-enlarge command to the display device, and the display device's processing so as to have a current contents displayed on the screen enlarged gradually and displayed based on the fourteenth remote-controlling signal; and (o) if a finger of the user drags in a diminishing helix on the touch surface of the touch-type input means while touching, the remote controller's sending a fifteenth remote-controlling signal containing a screen-diminish command to the display device, and the display device's processing so as to have a current contents displayed on the screen diminished gradually based on the fifteenth remote-controlling signal, wherein the user looks at the screen of the display device without looking at the remote controller and remote-controls by displaying touch-related motions that the user performs on the touch surface of the touch-type input means of the remote controller correspondingly on the screen of the display device.

In the methods for remote controlling mentioned above, a moving distance (L) of the cursor displayed on the screen of the display device correspondingly to the drag motion of the user on the touch surface of the touch-type input means may be determined as a value obtained by multiplying a moving distance (x) of the drag motion on the touch surface of the touch-type input means with a weight (w), and the weight (w) is determined so as to increase gradually from 1 as a velocity (v) of the drag motion on the touch surface of the touch-type input means increases from a specific minimum value. Here, if the velocity (v) of the drag motion does not exceed the minimum value the weight (w) becomes 1, so that the moving distance (L) of the cursor displayed on the screen of the display device is determined to be same as the moving distance (x) of the drag distance on the touch surface of the touch-type input means.

Alternatively, the moving distance (L) of the cursor displayed on the screen of the display device correspondingly to the drag motion on the touch surface of the touch-type input means may be determined to be a value obtained by multiplying a size magnification (k) of the screen of the display device with respect to the touch surface of the touch-type input means with the moving distance of the drag motion on the touch surface of the touch-type input means.

In the method for remote controlling, the display device may comprise a smart TV device, which works as an Internet communication terminal and at the same time as a television.

Effects of Invention

According to the invention, a smart TV can be controlled with a remote controller by looking at the screen of the smart TV, not the remote controller, while touching the touch surface of the remote controller with a fingertip. That is, without looking the screen of the remote controller, it is possible to remote-control as if touching the surface of the TV directly. Therefore, since there is no need to look at the remote controller and the TV screen alternatingly, the remote controller can be controlled comfortably and fast. Since it is to control without looking at the remote controller, there is no need to use a mirror-type remote controller displaying the same image as in the smart TV. Thus, a convenient and cheap remote controller can be made.

Also, according to the invention, as in using a mouse in a PC, the detailed control can be done conveniently using a cursor that is not used in a regular smart phone or remote controller.

Since the remote-controlling method of the invention is a type of remote-control using a touchscreen or touch pad, unlike conventional remote controllers provided with many keys for each function, the structure of remote controller is very simple. Also, since the hardware structure of such a remote controller is the same as the structure of the conventional smart phone, the smart phone may be used as a remote controller according to the invention by realizing the remote-controlling method as an application for smart phones.

BRIEF DESCRIPTION OF DRAWINGS

FIGS. 6 and 7 are diagrams for explaining a region-select method for selecting a plurality of items all together, in which FIG. 6 is how to select a rectangular region, and FIG. 7 is how to select a non-polygonal region.

BEST MODE OF EMBODIMENTS OF INVENTION

Below, referring to the Drawings, embodiments of the invention are going to be described in detail.

Figure 1:
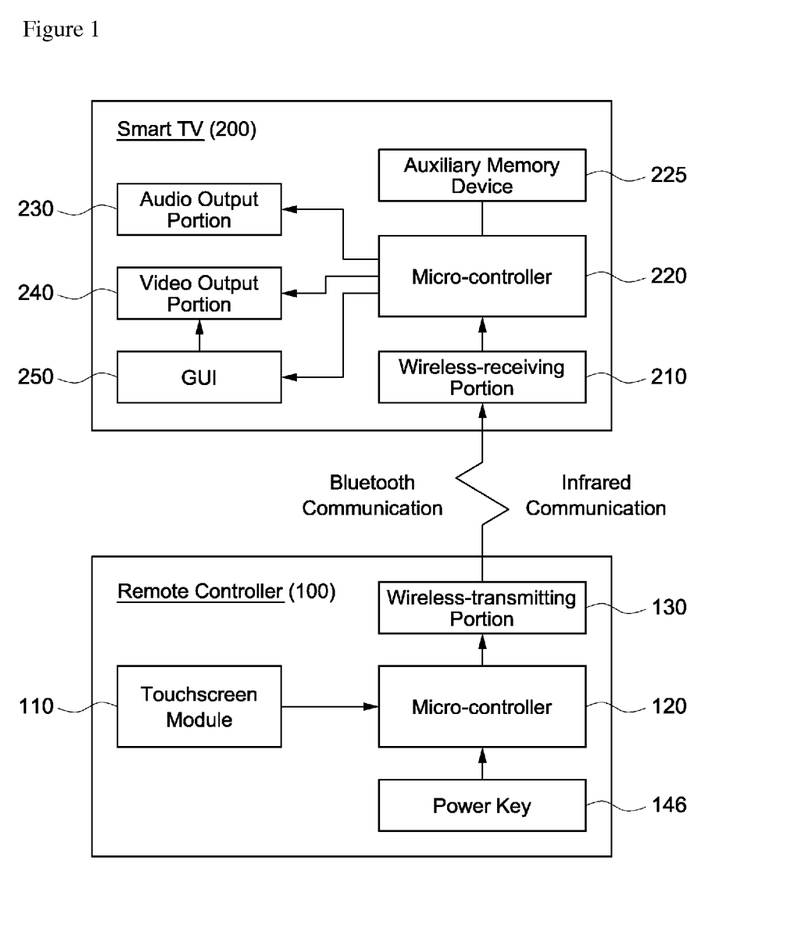
FIG. 1 is a block diagram showing a structure of a remote controller and a smart TV according to a preferable embodiment of the invention.

In FIG. 1 is briefly described a structure of a remote controller (100) and a smart TV (200), the object for the remote controller (100) to remote-control, according to the invention. The remote controller (100) comprises a touchscreen (110), a micro-controller (120), a wireless-transmitting portion (130), and a power switch (146) for turning on or off the power supply to the remote controller (100). It may further comprises a home button (148) used for instructing a state of the smart TV (200) to return to a home state.

An input means of the touchscreen (110) includes a pen called as a stylus, a regular pen, or fingers of a user. Below, cases of using fingers as the input means will be used for examples, but of course the same can be applied to cases of using other input means. The operations (referred as touch-related operations, below) that the user can perform on the touch surface of the touchscreen (110), for example, includes an operation of touching the touch surface of the touchscreen (110), an operation of releasing the touch right away after the touching (touch-and-release operation), an operation of performing 'touch-and-release operation' twice consecutively (referred as 'double touch' operation, below), an operation of slide-and-moving along a desired path while touching the touch surface (referred as 'drag' operation, below), etc.

The touchscreen (110) has two functions of displaying the touch-related operations performed by the user and inputting to the micro-controller (120). That is, the touchscreen (110) displays on the screen image information provided by the micro-controller (120). At the same time, if the user performs a touch-related operations on a point or region such as a picture or pictogram displayed on the touch surface of the touchscreen (110), information on the position on the screen where a pressure is applied or a touch is made is detected, converted to electrical signals, and provided to the micro-controller (120). Since this touchscreen (110) is used widely these days (for example, almost all of smart phones adopt them), and the structure and functions are well known to the experts in the community, more detailed description is omitted here.

As well known, the micro-controller (120) is a device combining a read/write memory for storing data, a read-only memory such as flash for storing codes, an EEPROM for storing transient data, auxiliary devices, input/output interfaces, etc. as well as regular numerical and logical components of a general-purpose microprocessor. Of course, instead of the micro-controller (120), using individual devices such as CPU, RAM, ROM, etc., a component equivalent to micro-controller may be realized. The information that is supplied from the touchscreen (110) to the micro-controller (120) includes whether the screen is touched or not in time, information on position of the touch which is made, etc. From this information, the time and location with which the touch-related operations are performed may be obtained, and using the information which operation the touch-related operation is can be determined. For example, in a case that the touch location changes to a neighboring point with time, that may be determined to be a drag motion, and further information such as the speed of the drag motion, starting point and drag path, ending point of the drag, etc. may be obtained. That is, the micro-controller (120) can determine contents of operations that the user performs by using the touch position information on the screen in time that the touchscreen (110) provides and comparing them with contents for each kind of operations stored in the memory in advance. And, it generates a remote-controlling signal containing predetermined codes corresponding to the contents of the determined operation, and provides to the wireless-transmitting portion (130).

The wireless-transmitting portion (130) modulates the remote-controlling signal that the micro-controller (120) provides according to a specific wireless communication type, and transmits wirelessly. For the type of wireless communication, near-range wireless communication methods such as infrared communication method or Bluetooth communication method are used.

The smart TV (200) to be controlled by the remote controller (100) includes a wireless-receiving portion (210), a micro-controller (220), a video-output portion (240), a graphic user interface (250), etc. for remote-controlling by the remote controller (100). Of course, the micro-controller (220) may be replaced with a structure made with individual devices such as CPU, RAM, ROM, etc. Also, additional storing devices formed with hard disk or flash memory may be further provided.

The wireless-receiving portion (210) receives the remote-controlling signal that the wireless-transmitting portion (130) of the remote controller (100) transmits wirelessly, demodulates, decodes, and provides to the micro-controller (220).

The micro-controller (220) performs calculating for displaying the cursor on a TV screen (260) with the information on remote-controlling received through the wireless-receiving portion (210) and processing for executing the remote-controlling commands that the remote controller (100) instructs. It calculates information (cursor position, cursor moving direction, distance, speed, etc.) for displaying the cursor on the TV screen (260). For example, when a remote-controlling command for selecting and deleting a certain item is given by the remote controller (100), the micro-controller (220) performs calculating for displaying a selected state by moving the cursor to the item, and a state that the item is deleted and disappears from the screen. The calculated information is provided to the video-output portion (240), and the video-output portion (240) receives the information and displays the movement of the cursor on the TV screen (260). Along with processing for displaying on the screen, the micro-controller (220) performs calculating so as to search the item to be deleted in the memory or storing device and process them to be deleted.

The size of the TV screen (260) is much larger than that of the touchscreen (140) of the touchscreen (110) of the remote controller (100). For example, when the drag operation is performed on the touchscreen (140) of the touchscreen (110), if it is the case of reflecting the same distance as the drag distance on the touchscreen (140) to the TV screen (260), it would be ineffective to perform several numbers of drags when dragging by a long distance on the TV screen (260) is needed. Considering the moving distance, direction, and speed, it is necessary to convert the drag operation on the touchscreen (140) so as to be adapted to the screen of the smart TV (200).

One method for calculating the moving distance of the cursor on the TV screen (260) is to calculate by applying the size ratio between the touchscreen (140) and the TV screen (260) to the moving distance on the touchscreen (140). That is, the moving distance (a'b') on the TV screen (260) is determined to be the value obtained by multiplying the moving distance (ab) with a size magnification k of the TV screen (260) to the touchscreen (140), that is, a'b'=k ab (refer to FIG. 5). Here, the magnification k may be obtained by the ratio of horizontal size or vertical size of the touchscreen (140) to the TV screen (260), or by the area ratio of the two screens (140, 260).

Figure 5:
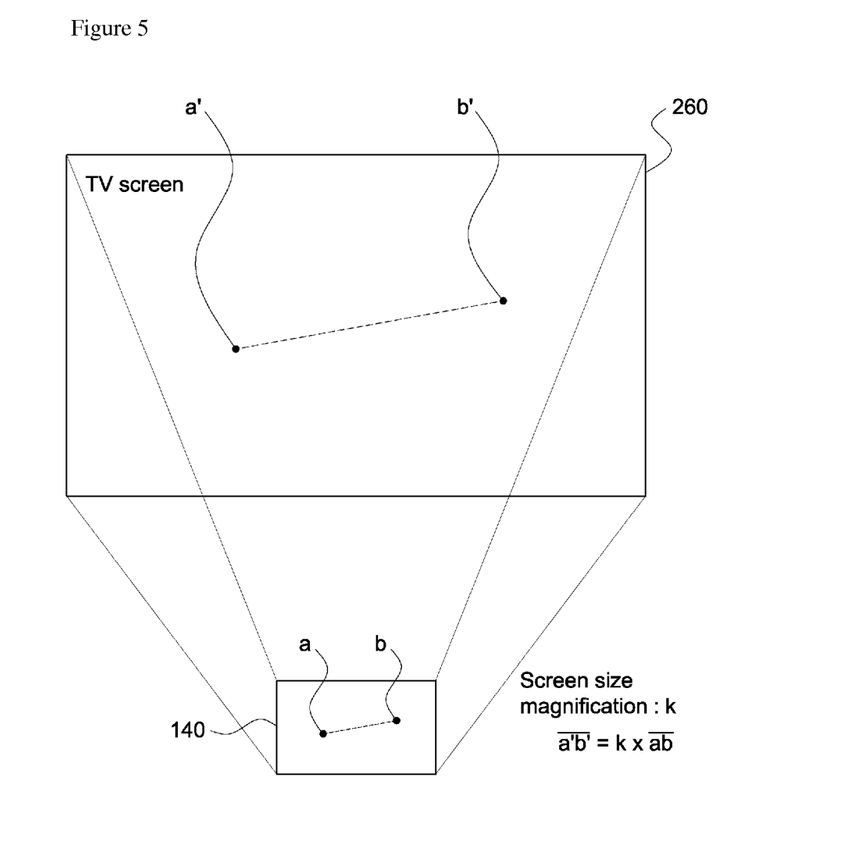
FIG. 5 is a diagram for explaining how to calculate a moving distance of cursor on a smart TV when the cursor is dragged.

Another method for calculating the moving distance of the cursor or an item to be moved on the TV screen (260) is a method of reflecting the drag speed further. That is, when the user performs a drag operation on the touchscreen (140), the drag speed is calculated and the weight (w) is determined according to the magnitude of the calculated drag speed. The weight may be determined as shown in Table 1, for an example. And the moving distance (a'b') on the TV screen (260) is determined to be the value obtained by multiplying the moving distance (ab) on the touchscreen (140) with the weight (w). If using the weight like this, the drag speed may be made slow when the moving distance is short, while the drag speed may be made fast for moving over a long distance, so that the control may be very convenient. Additionally, as a method for moving the cursor minutely, a minimum (20 [mm/s], for example) of the drag speed may be set, and if the drag speed does not exceed the minimum, the weight 1 may be applied. Then, the drag distance on the touchscreen (140) is reflected the same as a moving distance of the cursor on the TV screen (260), so that the cursor may be controlled sensitively.

TABLE 1

| Drag speed [mm/sec] | Weight (w) |
|---|---|
| 0~20 | 1 |
| 21~40 | 1.2 |
| 41~60 | 1.4 |
| 61~80 | 1.6 |
| 81~90 | 1.8 |
| 91~100 | 2.0 |
| ... | ... |
| 191~200 | 3.8 |
| ... | ... |

In the smart TV (200), the process for calculating the moving direction, distance, and speed of the cursor (or an item to drag) with information on the drag direction, distance, speed, and weight that the remote controller (100) provides may be performed by the micro-controller (220) of the smart TV (200), or by a graphic card (240) of the video-output portion (240).

Figure 2:
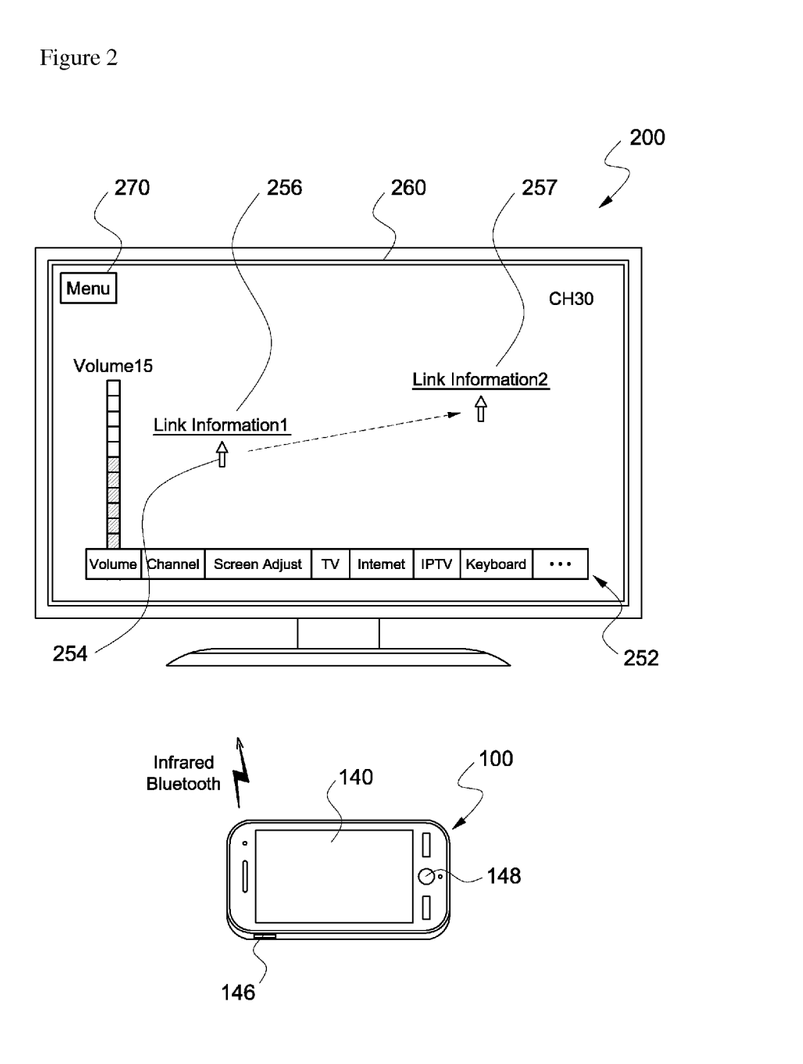
FIG. 2 is an exemplary diagram for describing a method for controlling a smart TV with a remote controller according to a preferable embodiment of the invention.

When a command for displaying a GUI screen is given by the remote controller (100), the graphic user interface (250) of the smart TV (200) receives an instruction of the micro-controller (220), and displays the GUI screen having a specific structure on the smart TV (200). The structure of the GUI screen may be diverse, and one shown in the lower portion of the TV screen (260) shown in FIG. 2 is an example of a main GUI screen (252). The user can manipulate the remote controller (100), select a desired menu on the main GUI screen (252), and instruct the execution of the menu. For example, if a user has the main GUI screen (252) appear and select and executes 'Internet' while watching 'TV', the graphic user interface (250) delivers this command of the user to the micro-controller (220), and the smart TV (200) converts its operation mode, so as to operate as an Internet terminal.

The audio output portion (230) converts audio signals provided by the micro-controller (220) to sound, and outputs it to a speaker or headphone jack.

In the remote-controlling system of the invention having such a structure and processing function, the touch-related operations performed by the user on the remote controller (100) and corresponding processes in the smart TV (200) are going to be explained more specifically. As will be clear from the description below, since the touch-related operations performed by the user on the touchscreen (140) of the touchscreen (110) of the remote controller (100) are displayed in real time correspondingly on the TV screen (260), the user can control the remote controller (100) just looking at the screen (260) of the smart TV (200), without any need to looking at the touchscreen (140) of the remote controller (100).

1. First Embodiment of Remote-Controlling Method (1) Moving Cursor or Item

If a user's finger touches the touchscreen (140) of the remote controller, then the cursor appears on the TV screen (260), and if the user drags (moves while touching) the finger while looking at the TV screen (260) and touching the touchscreen (140) with the finger, then the cursor on the screen (260) of the smart TV (200) also moves along a drag path of the finger on the touchscreen (140). The moving distance of the cursor moving on the TV screen (260) along the drag path on the touchscreen (140) of the remote controller is calculated as described in the above through a proper process, so that the cursor is displayed.

The description of the movement of the cursor can be applied to the movement of other items to be controlled.

(2) Displaying Menu

If moving the cursor using the above method and positioning the cursor at a main menu icon (270) in a predetermined location, the main menu (or GUI) (252) is displayed on the TV screen (260). For example, the main menu (252) includes sub-menu, etc. such as volume, channel, screen control, TV, Internet, IPTV, keyboard, etc. The user can execute a desired function or sub-menu by various controls on the main menu (252) described below. The structure of the main menu (252) shown in FIG. 2 is just for an example, and of course, the main menu (252) having different structure is possible.

(3) Selecting Item and Releasing Selection

If the user manipulates the touchscreen (140) of the touchscreen module (110), moves the cursor to an item to select on the TV screen (260), maintains the touch state on the item for longer than a specific time period (for example, 2 seconds), it is processed as the item has been selected on the TV screen (260) (below, referred as 'first selecting method').

As another method, if in a state of moving the cursor to the item to select, touching the same position again within a specific time period (for example, 2 sec) or 'touch-and-release' after releasing the touch from the touchscreen (140) of the remote controller (100) within the specific time period (for example, 2 sec), it can be processed so that the item is selected (below, referred as 'second selecting method').

As still another method, if moving the cursor to the item to select with a drag motion, entering the cursor inside the item and then retreating in reverse direction with a drag motion, and then releasing the touch (that is, if drag and touch release as if putting a check mark (✓) on the corresponding item), it can be processed so that the item is selected (below, referred as 'third selecting method').

Unselecting of item or menu that is selected already may be same as selecting. That is, after moving the cursor to the selected item and positioning the cursor there, if (i) maintaining the touch state longer than a specific time period (for example, 2 sec), (ii) releasing the touch state within a specific time period (for example, 2 sec) and then retouching the same position within a specific time period (for example, 2 sec) or 'touch-and-release', or (iii) dragging as if putting a check mark (✓) on the selected item and then releasing the touch, the selection which was made already is unselected.

In order for the user to see the selection of the item, it is preferable to highlight the selected item or change to a different color, so as to distinguish the before and after states visually, or to output a specific sound, so as to make the selection conceived auditorily. Also in the case of unselecting, the user is made to recognize the fact visually or auditorily by returning to the before state or outputting a sound of unselecting.

(4) Selecting Item and Executing (Enter)

Execution of item may be distinguished as two forms in general. One is a case that the time difference between an item selection operation and an item execution operation is long and thus it consists of discontinuous operations, and the other is a case that the time difference between item selection operation and the item execution operation is short and thus it consists of continuous operations.

First, it is a case that there is a selection operation of a specific item (or menu) by the selection operation comprising the first, second, and third selecting methods described in the above, and after a specific time period (for example, 2 sec) the execution of the selected operation is performed. The execution of the selected operation is performed by double-touching the selected item or an arbitrary position of the touchscreen (140) within a specific time period (for example, 0.5~1 sec). Since the selection and execution operations are discontinuous, for example, this method is suitable when several items are selected first and then executed all at once.

This 'select-and-execute' may be applied to a case of editing bookmarks, for example. Let's suppose a case of collecting desired channels or genre as bookmarks. The bookmarks will be convenient if displayed on the screen of the main menu (252). In a case that the user wants to change the contents of the bookmarks, it can be done using the selection method. For example, in a case of selecting using drag of the check mark (✓) shape, the desired item (channel) is selected by dragging in a form of the check mark (✓), entering the desired item (channel) on the touchscreen (140) from outside to inside and then returning back to outside. Then if performing double-clicks at an outside region of the bookmarks, the checked item is listed (executed). Next, a desired editing function may be executed to the checked items that were listed.

Next, in a case that the selection operation and the execution operation of the selected item (for example, selecting operation of the item such as menu of the main menu (252) or link information (256, 257) displayed on the TV screen (260) and an operation instructing the execution command of the selected item) are performed consecutively, the execution command of the selected item is done in the following three ways.

(α) First execution method: In a state of touching a finger on the touchscreen (140) of the remote controller (100), after dragging (moving) the cursor to a desired position, the touch is released from the touchscreen (140) within a specific time period (for example, 2 sec). If a specific time period (for example, 2 sec) passes without any operation after the touch release, the item (menu or link information) at the position that was touch-released is executed.

(β) Second execution method: In a state of moving the cursor to the item to execute by a drag motion (same as in the first execution method so far), after the touch is released from the touchscreen (140) of the remote controller (100) within a specific time period (for example, 2 sec), if 'touch-and-release' a specific region including the item or the neighboring region is done again within a specific time period (for example, 1~2 sec), the item is executed.

(γ) Third execution method: In a state of moving the cursor to the item to execute by a drag motion (same as in the first execution method so far), just like an execution method in a PC, after the touch is released from the touchscreen (140) of the remote controller (100) within a specific time period (for example, 2 sec), if double-touching a specific region including the item or the neighboring region is done again within a specific time period (for example, 1~2 sec), the item is executed.

The various execution methods mentioned in the above can be done just by looking at the TV screen (260), without any need to look at the touchscreen (140) of the remote controller (100). Thus, in remote-controlling, since there is no need to look at the remote controller (100) and the smart TV (200) alternatingly, the convenience to the user is increased. In addition, since the selection and execution of item occur at the same time, inaccurate inputs are prevented from the source.

(5) Selecting Item and Moving (Drag-and-Drop)

First, the user selects an item to move with one of the selection methods described in the above on the touchscreen (140) of the remote controller (100).

In a state of selecting the desired item and maintaining as such, it is dragged to a desired position. Then the item is moved along the drag path. And the finger touch is released from the touchscreen (140) at the desired position. If a specific time period (for example, 1 sec) passes after releasing the touch, the item is dropped at the last position where the finger was detached. By such operations, an item may be moved to a different position.

(6) Deleting Selected Item

Figure 4:
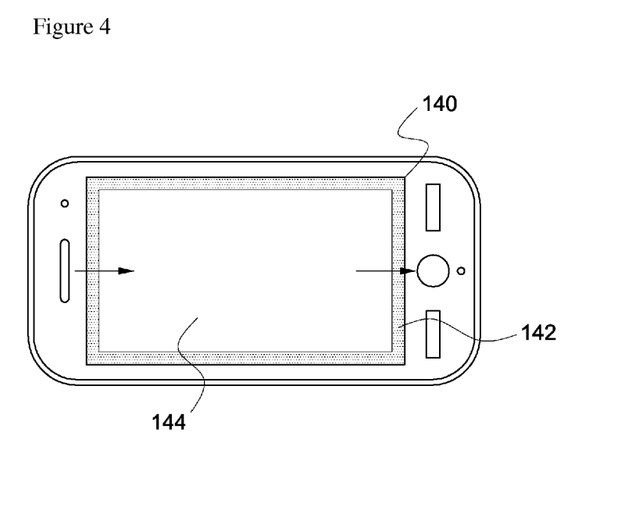
FIG. 4 is a diagram showing an external structure of a remote controller according to a preferable embodiment the invention.

Using a border band (142), it is possible to delete a desired item. The cursor is moved and positioned at an item to delete, the item is selected using one of the first to third selection methods, and then dragged out of the border band (142) while touching the item with the finger. The item dragged out of the border band (142) is deleted.

(7) Editing Selected Item

This function is similar to a function of the right button of PC mouse. First in a state of moving the cursor with a finger and selecting a desired item (the finger is in touch with the item in this state), if other finger touches a surface of the touchscreen (140) of the remote controller (100) once, a sub-menu collecting the editing functions (for example, some or entire functions such as find, replace, correct, copy, cut, paste, redo, etc.) appears. In such a state, for executing an item of the sub-menu, the cursor is moved to a desired item of the sub-menu and one of the above execution methods is performed.

(8) Selecting and Moving a Plurality of Items

Figure 6:
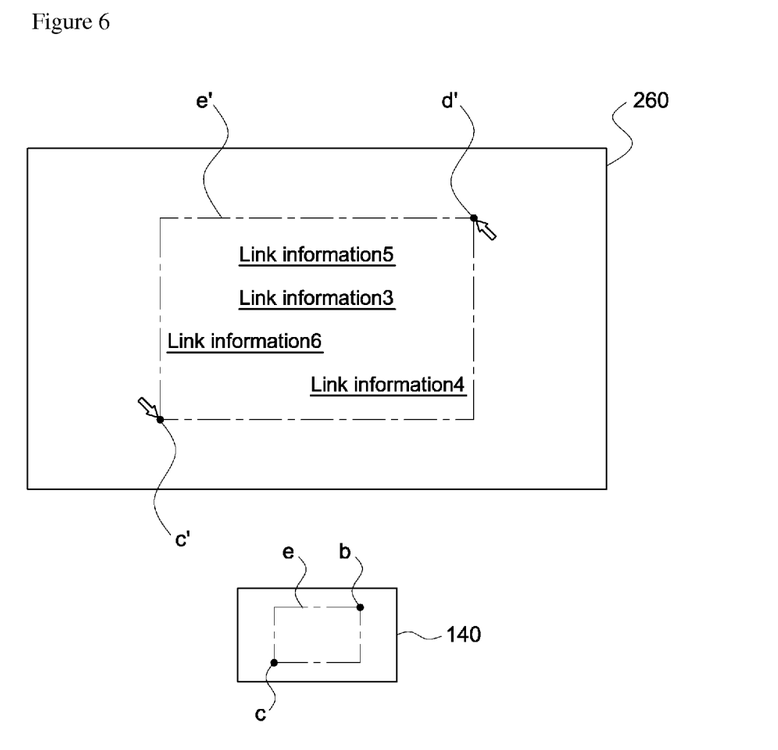

Like using multi-touch function, as shown in FIG. 6, if a specific time period (for example, 1~2 sec) passes after touching two positions (c, d) of the touchscreen (140) of the remote controller (100) at the same time, two cursors appear on the TV screen and a rectangular region (e) with a line connecting the two cursors as a diagonal line is displayed, and all items in the rectangle (e) are all selected ('selecting a rectangular region').

Figure 7:
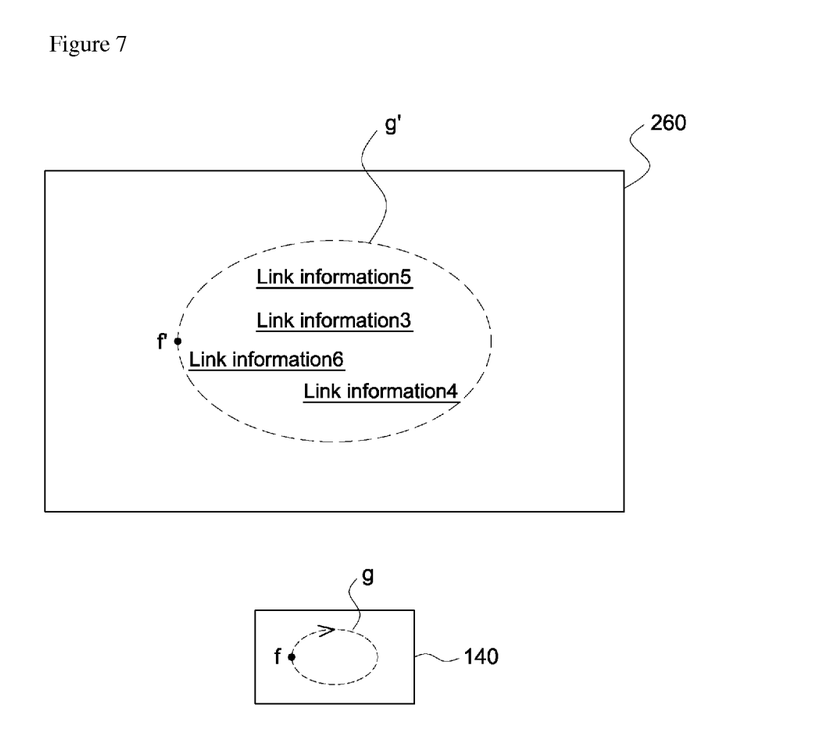

As shown in FIG. 7, besides the method of selecting a rectangular region, a non-rectangular selection method ('selecting a non-rectangular region') is also possible, in which if after touching two fingers on the touchscreen (140) of the remote controller (100) at the same time, releasing the touch of one finger within a specific time period (for example, 1~2 sec), dragging with the other finger in touch starting at a position (f), so as to draw a closed curve (g), a region enclosed by a corresponding closed curve (g') at a corresponding position (f) on the TV screen (260) is defined, and all items in the closed curve (g') are selected.

If the user sets a region like this, all the items in the region are processed as selected. After selecting the desired region as such, by performing continuing operations, a desired process (editing such as move, delete, execute, copy, etc.) can be performed. For example, in order to move the selected items to other position, after selection, the finger while touching the region drags to a desired position on the touchscreen (140) of the remote controller (100) and the touch is released. Then all items in the region are dropped (moved) at the position. In order to delete the selected items, after selection, they can be dragged out of the border band (142) in a state of touching the region with the finger on the touchscreen (140) of the remote controller (100). In order to execute all the selected items all at once, the region may be double-touched. Also, in order to edit the selected items, while one finger touches the region, the other finger touches the outside of the region. Then, the sub-menu collecting the editing functions (for example, some or entire functions such as find, replace, correct, copy, cut, paste, redo, etc.) that was mentioned in (7) reappears, and a desired editing in the region can be done using it.

(9) Screen Scroll and Page Turning

For a screen scrolling (moving), a method in conventional touchscreen-type smart phones cannot be applied, in which if moving a finger while touching the touchscreen the screen also moves. It is because even though the finger moves while touching the touchscreen the screen must be in a stationary state for executing the other functions described in the above. The screen scroll needs to be done with a separate operation.

As shown in FIG. 4, the border band (142) having a specific width (about 5~10 mm) going all around the edge of rectangle of the screen (144) on the touchscreen (140) of the remote controller (100) is assigned. If dragging from outside to inside crossing the border band (142) or reversely from inside to outside of the border band (142) crossing the border band (142), the screen is processed to scroll (move) in the drag direction. That is, if dragging from the left outside of the border band to the inside of the border band (142) crossing the border band rightwards on the touchscreen (140) of the remote controller (100), the entire screen (260) of the smart TV (200) is processed to move rightwards. Also, if dragging from the right outside of the border band to the inside of the border band (142) crossing the border band leftwards on the touchscreen (140) of the remote controller (100), the entire screen (260) of the smart TV (200) is processed to move leftwards. This looks as if the TV screen (260) is scrolled rightwards or leftwards.

The upward and downward scrolls are processed likewise.

If the scrolling amount gets a lot, the page is changed, so that the same effect as page turning takes place.

TABLE 2

| One finger touch (display cursor) → drag to other position in a state of touch (move cursor) | Maintain the touch state at a desired item longer than a specific time period ($1^{st}$ selection) | After selecting an item and passing a specific time period, double-touch the selected item or anywhere (select-and-execute) |
|---|---|---|
| | Release the touch state at a desired item within a specific time period and then retouch the item ($2^{nd}$ selection) | After selecting an item and dragging to a desired position, pass a specific time period (move selected item) |
| | Drag the desired item as if putting a check mark (✓) ($3^{rd}$ selection) | Select an item and drag out of border band (delete selected item) |
| | | Select an item, touch with other finger (Pop-up editing menu of selected item) → (Select and execute editing menu) |

TABLE 2-continued

Ending portion of dragging is in a main menu icon (display main menu)
→
(move a cursor and then select a sub-menu)
After touch-release on a desired item within a specific time period, no
operation longer than a specific time period (1$^{st}$ execution)
After touch-release on a desired item within a specific time period, touch
and touch-release the item within a specific time period (2$^{nd}$ execution)
Double touch a desired item within a specific time period (3$^{rd}$ execution)
Maintain two fingers in touch longer that a specific time period (select all items in a rectangular region)
After touching two fingers, drag in a closed curve with one finger within a specific time period (select all items in a non-rectangular region)
Drag from outside of border band to inside or from inside to outside (screen scrolling and page turning)
Drag along a path of an enlarging helix in a touch state (screen enlarging) or along a path of a diminishing helix in a touch state (screen diminishing)

(10) Enlarging or Diminishing Screen

If the user draws a circle in helix larger and larger with a finger touching a surface of the touchscreen (140) of the remote controller (100), the image displayed on the TV screen (260) or selected image is processed to be enlarged gradually accordingly.

On the contrary, if drawing the circle in smaller and smaller helix, the image displayed on the TV screen (260) or selected image is processed to be diminished gradually accordingly.

The operations of remote controller by the user and corresponding results of execution on the smart TV (200) (results in parentheses) are summarized in Table 2.

Besides, the following remote-controlling is possible.

(11) Channel/Volume Display

The method for controlling channel and volume of the TV (200) can be realized in two ways. One is that as in the conventional TV remote controller a channel button (not shown) and a volume button (not shown) may be provided separately in the remote controller (100). The user can control the buttons, changing channels and adjusting the volume. Here, by displaying volume bar and channel bar on the TV screen (260), the user may be helped to select the volume and channel easily.

The other method is to use the menu (252). The cursor is moved to a main menu icon (270) and the menu (252) is displayed on the TV screen (260), and if selecting a sub-menu 'volume', a volume bar is displayed vertically. In such a state, the cursor may be moved to select a desired volume. The channel selection is same. After moving the cursor and selecting the sub-menu 'channel', a desired channel is selected on the channel bar (having channel numbers displayed in a form of bar or band) displayed on the TV screen (260).

In the above methods for selecting volume or channel, the desired volume or channel number may be selected by moving the volume bar or channel bar up and down in a scrolling manner and aligning with an arrow mark provided on a specific height of the TV screen (260). If a specific time period (for example, 1 sec) passes after aligning the desired volume or channel with the arrow mark, it is processed to select the volume or channel.

(12) Keyboard Input

The user can perform the keyboard input also while watching the TV screen (260). If the user selects 'keyboard' item from the menu items provided by the main menu (252), the menu <TV: Remote Controller> is made to appear on the TV screen (260). And if the user selects 'TV' in the menu <TV: Remote Controller>, a keyboard (for example, a navigation-input keyboard having a letter per key) appears on the TV screen (260). In such a state, the user can input characters by selecting desired characters while looking at the TV screen (260). That is, a character is made to be input by moving the cursor to a desired character, maintains a touch longer than a specific time period, and then releases the finger (the first selection method), or by moving the cursor, releasing the finger right away at the desired character, and retouching the character one more time (the second selection method).

Of course, it is also possible to input characters while looking at the touchscreen (140) of the remote controller (100). For that, if the user selects 'remote' from the menu <TV: Remote Controller> displayed on the TV screen (260), a character board appears on the screen of the touchscreen (140) of the remote. The input method on the character board is same as that of a mobile phone having a touchscreen.

2. Second Embodiment of Remote-Controlling Method

The second embodiment has some difference as follows in selection and execution from the first embodiment. Other operations are same.

First, the method of selecting a desired item adopts the second and third selection methods only out of the three methods proposed in the first embodiment, and the first method (selecting the item by maintaining a touch state longer than a specific time period (for example, 2 sec) on the desired item) is not adopted.

The first, second, and third execution methods described in the first embodiment are changed as follows as a fourth, fifth, and sixth execution methods because the first selection method is not adopted. The three execution methods, since the second embodiment does not adopt the first selection method and there is no limit to maintaining a touch state on the desired item longer than a specific time period (for example, 2 sec), any time limit may be omitted in the touch release operations, in which it is different from the first embodiment.

(α) Fourth execution method: In a state of touching a finger on the touchscreen (140) of the remote controller (100), after dragging (moving) the cursor to a desired position, the touch is released from the touchscreen (140) (no time limit to this touch-release operation). If a specific time period (for example, 2 sec) passes without any operation after the touch release, the item (menu or link information) at the position that was touch-released is executed.

(β) Fifth execution method: In a state of moving the cursor to the item to execute by a drag motion, after the touch is released from the touchscreen (140) of the remote controller (100) (no time limit to this touch-release operation), if 'touch-and-release' a specific region including the item or the neighboring region again within a specific time period (for example, 1~2 sec), the item is executed.

(γ) Six execution method: In a state of moving the cursor to the item to execute by a drag motion, after the touch is released from the touchscreen (140) of the remote controller (100) (no time limit to this touch-release operation), if double-touching a specific region including the item or the neighboring region again within a specific time period (for example, 1~2 sec), the item is executed.

Figure 3:
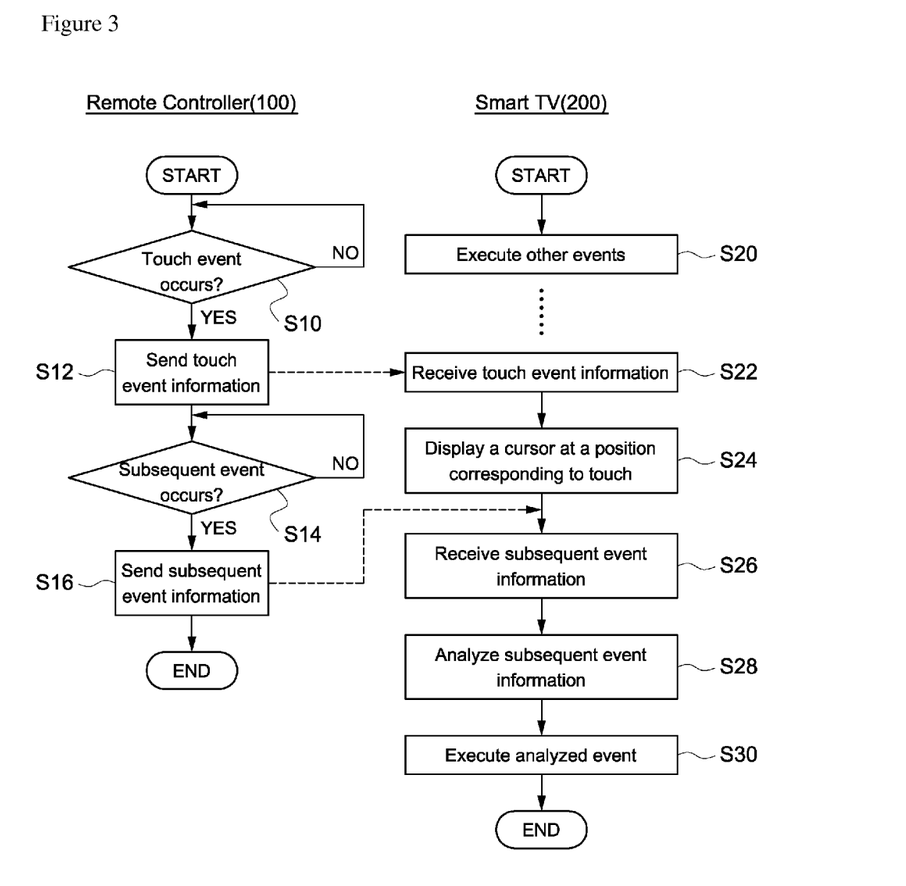
FIG. 3 is a flow chart showing procedures for remote-controlling a smart TV with a remote controller according to a preferable embodiment of the invention.

On the other hand, FIG. 3 shows a flowchart for contents processed by the remote controller (100) and the smart TV (200) in order to perform the remote control functions mentioned for example in the above.

The first motion that the user performs for the first time to control the remote controller (100) is an action of touching a finger on the touchscreen (140). The micro-controller (120) of the remote controller (100) checks whether a touch event happens on the touchscreen (140) periodically using a signal provided by the touchscreen module (110) (step S10). If confirmed the happening of touch event, the micro-controller (120) generates a remote-controlling signal containing time and position information of the touch and sends it to the smart TV (200) through the wireless-transmitting portion (130) (step S12). The wireless communication between the wireless-transmitting portion (130) and the wireless-receiving portion (210) is realized through a Bluetooth communication or infrared communication.

The micro-controller (220) of the TV (200) receives the information on the touch event through the wireless-receiving portion (210) (step S22), and makes the cursor displayed at a position corresponding to the touch position on the TV screen (260) through the video-output portion (240) (step S24). And, it waits for subsequent remote-controlling signal that the remote controller (100) is going to send.

The micro-controller (120) of the remote controller (100) checks signals from an output port of the touchscreen module (110), and monitors whether the user performed any subsequent operations (that is, if any subsequent event happens) to the touchscreen (140) after the touch event (step S14). After touching the touchscreen (140), the user can performs, for example, (i) maintaining the touch state at the touch position longer than a specific time period (for example, 2 sec) without any further operations, (ii) releasing the touch state within a specific time period (for example, 2 sec) after the touch, (iii) dragging (moving) the finger in the touch state to other position without detaching from the touchscreen (140), (iv) touching the touchscreen (140) with other finger, (v) keeping to drag in enlarging or diminishing helix, etc. If the user's subsequent controlling (event) of the touchscreen (140) happens, the micro-controller (120) also generates a remote-controlling signal about that and sends it to the smart TV (200) through the wireless-transmitting portion (130). The micro-controller (220) of the smart TV (200) receives through the wireless-receiving portion (210) (step S26), analyzes the remote-controlling signal (step S28), executes the analyzed subsequent event through the video-output portion (240) and/or the graphic user interface (250), and displays the execution result on the TV screen (260). Even though it has been explained using the remote controller (100) of the invention as an example, since conventional smart phones are equipped with the hardware structure of the remote controller (100), such smart phones may be used for the remote controller (100) of the invention. For this, the above various remote functions described in the above may be realized as applications for smart phones, and they may be installed in a smart phone to be used as the remote controller (100).

Also, it was described using the touchscreen module (110) as a user input means of the remote controller (100). The remote-controlling method according to the invention is a method enabling the user to control the smart TV (200) by looking at the screen (260) only, without any need to look at the remote controller (100) while controlling the remote controller. Therefore, in forming the remote controller (100), the touchscreen (140) may be replaced with a touch pad. Since in the touch pad the mouse pointer is controlled by touching the finger on a sensor having a shape of flat plate, the user can manipulate in the subsequently same ways as the touchscreen. Besides the touchscreen or touch pad, if it is able to input controlling command by combining touch and drag on a surface, other types of touch-input means (including means to be developed in the future) may be a component for the remote controller (100) that the invention proposes.

The descriptions about the invention in the above are just embodiments of the invention. One skilled in the field of arts may change and modify the invention variously without leaving the spirit and scope of the invention claimed in the claims below. Therefore, all the changes that are equivalent or inclusive to the claims of the invention belong to the scope of the invention.

INDUSTRIAL APPLICATIONS

The invention may be applied very effectively to so-called smart TVs having combined functions of conventional TV and Internet terminal. However, it is not limited to that. It can be applied widely to various display devices having a screen and a need of remote-controlling.

The invention claimed is:

1. A method for remote controlling, in which a remote controller having a touch-type input means including a touchscreen or a touch pad executes a specific program, sends wirelessly a remote-controlling signal to a display device having a screen, and controls the display device, the method comprising steps for:

(a) if a touch of a user's finger occurs on a spot of a touch surface of the touch-type input means, the remote controller's sending a first remote-controlling signal having information on position and time of the touch to the display device, and the display device's displaying a cursor at a region corresponding to the position of the touch on the screen based on the received first remote-controlling signal;

(b) if the user's finger drags along a first drag path while being in touch with the touch surface of the touch-type input means, the remote controller's sending a second remote-controlling signal having information on tracking path of the first drag path to the display device, and the display device's displaying so that the cursor moves along a path on the display device corresponding to the first drag path based on the received second remote-controlling signal; and (c) if it is (i) a first case that the user's finger on the touch surface of the touch-type input means maintains a touch state at an ending portion of the first drag path longer than a first specific time period, (ii) a second case that the user's finger on the touch surface of the touch-type input means releases the touch state at the ending portion of the first drag path within a second specific time period and touches the ending portion again right away within a third specific time period, or (iii) a third case that the first drag path includes a drag having a shape of a check mark (✓), the remote controller's sending a third remote-controlling signal containing a selection command for a specific item positioned at the ending portion of the first drag path or the check mark to the display device, and the display device's processes to select the specific item from the screen based on the received third remote-controlling signal, wherein touch-related motions that the user performs on the touch surface of the touch-type input means of the remote is configured to be displayed correspondingly on the screen of the display device, so that the user controls remotely just looking at the screen of the display device, without any need to look at the remote controller.

2. The method for remote controlling of claim 1, further comprising a step for (d) the remote's sending a fourth remote-controlling signal containing an execution command of the specific item where the ending portion of the first drag path or the check mark (✓) is positioned to the display device, and the display device's processing the execution of the specific item based on the fourth remote-controlling signal and at the same time displaying a result of the execution, in a case that (1) in any one of the first case, the second case, and the third case, with the user's finger on the touch surface of the touch-type input means, the specific item is selected and double-touches a specific region including the ending portion of the first drag path or the check mark (✓) in a fourth specific time period, (2) after the drag after releasing the touch within a fifth specific time period at the ending portion of the first drag path or an end of the check mark (✓), (α) a sixth specific time period passes without any operation or (β) within a seventh specific time period the user 'touches and then releases the touch at' the specific region including the ending portion of the first drag path or the end of the check mark (✓), or (3) the user double-touches the specific region including the ending portion of the first drag path or the check mark (✓) within an eighth specific time period.

3. The method for remote controlling of claim 1, further comprising a step for (d-1) the remote's sending a fifth remote-controlling signal containing an execution command of the specific item where the ending portion of the first drag path or the check mark (✓) is positioned to the display device, and the display device's processing the execution of the specific item based on the fifth remote-controlling signal and at the same time displaying a result of the execution, in a case that after the user's finger on the touch surface of the touch-type input means selects the specific item corresponding to the second case or the third case of the step (c) and releases the touch at the ending portion of the first drag path or at the end of the check mark (✓), (α) a ninth specific time period passes without any operation or (β) the user 'touches and then releases the touch at' or double-touches the specific region including the ending portion of the first drag path or the check mark (✓).

4. The method for remote controlling of claim 1, further comprising a step for (e) in a state that the specific item is selected through the step (c), if a tenth specific time period passes after the user's finger on the touch surface of the touch-type input means drags to and releases the touch at a desired position along a second drag path while touching a portion where the ending portion of the first drag path or the check mark (✓) is positioned, the remote's sending a sixth remote-controlling signal containing an information on the second drag path and a movement command of the specific item to the display device, and the display device's processing so that the specific item moves along the second drag path based on the sixth remote-controlling signal.

5. The method for remote controlling of claim 1, further comprising steps for:
(f) setting a border band circumnavigating an edge portion of the touch surface of the touch-type input means in the remote controller; and
(g) if the user's finger drags outside crossing the border band in a state that the user's finger touches a position on the touch surface of the touch-type input means corresponding to the specific item selected through the step (c), the remote controller's sending a seventh remote-controlling signal containing a deletion command of the selected specific item to the display device, and the display device's processing so that the specific item is deleted based on the seventh remote-controlling signal.

6. The method for remote controlling of claim 1, further comprising steps for:
(f) setting a border band circumnavigating an edge portion of the touch surface of the touch-type input means in the remote controller; and
(h) if the user's finger drags from outside the border band on the touch surface of the touch-type input means to a region enclosed by the border band or reversely, the remote controller's sending an eighth remote-controlling signal containing information of drag direction and speed and a screen scroll command to the display device, and the display device's processing so that a present page displayed on the screen scrolls with the drag direction and speed based on the eighth remote-controlling signal.

7. The method for remote controlling of claim 1, further comprising a step for (j) if other finger of the user touches an arbitrary position on the touch surface of the touch-type input means in a state the specific item is selected through the step (c), the remote controller's sending a ninth remote-controlling signal containing a position information of the ending portion of the first drag path or the check mark (✓) and editing-mode information on the specific item positioned at the ending portion or the check mark (✓) to the display device, and the display device's displaying an editing menu containing more than one editing functions and processing so as to enable editing using the editing functions based on the ninth remote-controlling signal.

8. The method for remote controlling of claim 1, wherein a moving distance (L) of the cursor displayed on the screen of the display device correspondingly to the drag motion of the user on the touch surface of the touch-type input means is determined as a value obtained by multiplying a moving distance (x) of the drag motion on the touch surface of the touch-type input means with a weight (w), and the weight (w) is determined so as to increase gradually from 1 as a velocity (v) of the drag motion on the touch surface of the touch-type input means increases from a specific minimum value.

9. The method for remote controlling of claim 8, wherein if the velocity (v) of the drag motion does not exceed the minimum value the weight (w) becomes 1, so that the moving distance (L) of the cursor displayed on the screen of the display device is determined to be same as the moving distance (x) of the drag distance on the touch surface of the touch-type input means.

10. The method for remote controlling of claim 1, wherein the moving distance (L) of the cursor displayed on the screen of the display device correspondingly to the drag motion on the touch surface of the touch-type input means is determined to be a value obtained by multiplying a size magnification (k) of the screen of the display device with respect to the touch surface of the touch-type input means with the moving distance of the drag motion on the touch surface of the touch-type input means.

11. The method for remote controlling of claim 1, wherein the display device comprises a smart TV device, which works as an Internet communication terminal and at the same time as a television.

12. A method for remote controlling in which a remote controller having a touch-type input means including a touchscreen or a touch pad executes a specific program, sends wirelessly a remote-controlling signal to a display device having a screen, and controls the display device, the method comprising steps for:
- (k1) if a state that two fingers of the user touches two positions on the touch surface of the touch-type input means at the same time is maintained for over an eleventh specific time period, the remote controller's sending a tenth remote-controlling signal containing position information of the two positions touched at the same time and a region-selection command to the display device, and the display device's determining a rectangular region with a line connecting two positions on the screen corresponding to the two positions as a diagonal line and processing all items existing in the rectangular region as selected based on the received tenth remote-controlling signal, and (k2) if within a twelfth specific time period after the user's two fingers touch the two positions on the touch surface of the touch-type input means any one of the two fingers releases the touch and the remaining one drags so as to circumnavigate along a closed curve path, the remote controller's sending an eleventh remote-controlling signal containing information of the closed curve path and a region-selection command to the display device, and the display device's determining a non-polygonal region formed by a closed curve path on the screen corresponding to the closed curve path and processing so as to have all items existing in the non-polygonal region selected based on the eleventh remote-controlling signal; and
- (l) if in a state of touching a specific region of the touch surface of the touch-type input means corresponding to the rectangular or non-polygonal region the user's finger drags along a third drag path, releases the touch, and a thirteenth specific time period passes, the remote controller's sending an twelfth remote-controlling signal containing information of the third drag path and a movement command of all items in the selected rectangular region or non-polygonal region to the display device, and the display device's processing so as to have all items existing in the rectangular region or non-polygonal region move along the third drag path based on the twelfth remote-controlling signal,
wherein the user looks at the screen of the display device without looking at the remote controller and remote-controls by displaying touch-related motions that the user performs on the touch surface of the touch-type input means of the remote controller correspondingly on the screen of the display device.

13. The method for remote controlling of claim 12, wherein a moving distance (L) of the cursor displayed on the screen of the display device correspondingly to the drag motion of the user on the touch surface of the touch-type input means is determined as a value obtained by multiplying a moving distance (x) of the drag motion on the touch surface of the touch-type input means with a weight (w), and the weight (w) is determined so as to increase gradually from 1 as a velocity (v) of the drag motion on the touch surface of the touch-type input means increases from a specific minimum value.

14. The method for remote controlling of claim 13, wherein if the velocity (v) of the drag motion does not exceed the minimum value the weight (w) becomes 1, so that the moving distance (L) of the cursor displayed on the screen of the display device is determined to be same as the moving distance (x) of the drag distance on the touch surface of the touch-type input means.

15. The method for remote controlling of claim 12, wherein the moving distance (L) of the cursor displayed on the screen of the display device correspondingly to the drag motion on the touch surface of the touch-type input means is determined to be a value obtained by multiplying a size magnification (k) of the screen of the display device with respect to the touch surface of the touch-type input means with the moving distance of the drag motion on the touch surface of the touch-type input means.

16. A method for remote controlling in which a remote controller having a touch-type input means including a touchscreen or a touch pad executes a specific program, sends wirelessly a remote-controlling signal to a display device having a screen, and controls the display device, the method comprising steps for:
- (f) setting a border band circumnavigating an edge portion of the touch surface of the touch-type input means; and
- (k1) if a state that two fingers of the user touches two positions on the touch surface of the touch-type input means at the same time is maintained for over an eleventh specific time period, the remote controller's sending a tenth remote-controlling signal containing position information of the two positions touched at the same time and a region-selection command to the display device, and the display device's determining a rectangular region with a line connecting two positions on the screen corresponding to the two positions as a diagonal line and processing all items existing in the rectangular region as selected based on the received tenth remote-controlling signal, and (k2) if within a twelfth specific time period after the user's two fingers touch the two positions on the touch surface of the touch-type input means any one of the two fingers releases the touch and the remaining one drags so as to circumnavigate along a closed curve path, the remote controller's sending an eleventh remote-controlling signal containing information of the closed curve path and a region-selection command to the display device, and the display device's determining a non-polygonal region formed by a closed curve path on the screen corresponding to the closed curve path and processing so as to have all items existing in the non-polygonal region selected based on the eleventh remote-controlling signal; and
- (m) if in a state of touching a specific region on the touch surface of the touch-type input means corresponding to the rectangular or non-polygonal region the user's finger drags outward crossing the border band, the remote controller's sending a thirteenth remote-controlling signal containing a deletion command of all items in the selected rectangular or non-polygonal region to the display device, and the display device's processing so as to have all items in the rectangular or non-polygonal region deleted based on the thirteenth remote-controlling signal, wherein the user looks at the screen of the display device without looking at the remote controller and remote-controls by displaying touch-related motions that the user performs on the touch surface of the touch-type input means of the remote controller correspondingly on the screen of the display device.

17. The method for remote controlling of claim 16, wherein a moving distance (L) of the cursor displayed on the screen of the display device correspondingly to the drag motion of the user on the touch surface of the touch-type input means is determined as a value obtained by multiplying a moving distance (x) of the drag motion on the touch surface of the touch-type input means with a weight (w), and the weight (w) is determined so as to increase gradually from 1 as a velocity (v) of the drag motion on the touch surface of the touch-type input means increases from a specific minimum value.

18. A method for remote controlling in which a remote controller having a touch-type input means including a touchscreen or a touch pad executes a specific program, sends wirelessly a remote-controlling signal to a display device having a screen, and controls the display device, the method comprising steps for:

(n) if a finger of the user drags in an enlarging helix on the touch surface of the touch-type input means while touching, the remote controller's sending a fourteenth remote-controlling signal containing a screen-enlarge command to the display device, and the display device's processing so as to have a current contents displayed on the screen enlarged gradually and displayed based on the fourteenth remote-controlling signal; and (o) if a finger of the user drags in a diminishing helix on the touch surface of the touch-type input means while touching, the remote controller's sending a fifteenth remote-controlling signal containing a screen-diminish command to the display device, and the display device's processing so as to have a current contents displayed on the screen diminished gradually based on the fifteenth remote-controlling signal, wherein the user looks at the screen of the display device without looking at the remote controller and remote-controls by displaying touch-related motions that the user performs on the touch surface of the touch-type input means of the remote controller correspondingly on the screen of the display device.

19. The method for remote controlling of claim 18, wherein a moving distance (L) of the cursor displayed on the screen of the display device correspondingly to the drag motion of the user on the touch surface of the touch-type input means is determined as a value obtained by multiplying a moving distance (x) of the drag motion on the touch surface of the touch-type input means with a weight (w), and the weight (w) is determined so as to increase gradually from 1 as a velocity (v) of the drag motion on the touch surface of the touch-type input means increases from a specific minimum value.

20. The method for remote controlling of claim 19, wherein if the velocity (v) of the drag motion does not exceed the minimum value the weight (w) becomes 1, so that the moving distance (L) of the cursor displayed on the screen of the display device is determined to be same as the moving distance (x) of the drag distance on the touch surface of the touch-type input means.

21. The method for remote controlling of claim 18, wherein the moving distance (L) of the cursor displayed on the screen of the display device correspondingly to the drag motion on the touch surface of the touch-type input means is determined to be a value obtained by multiplying a size magnification (k) of the screen of the display device with respect to the touch surface of the touch-type input means with the moving distance of the drag motion on the touch surface of the touch-type input means.

* * * * *